(12) United States Patent
Bonnefoy et al.

(10) Patent No.: US 11,760,490 B2
(45) Date of Patent: Sep. 19, 2023

(54) DEVICE FOR CLOSING A SPACE WITHIN AN AIRPLANE

(71) Applicant: Safran Seats, Plaisir (FR)

(72) Inventors: Bastien Bonnefoy, Issoudun (FR); Laurent Ligonniere, Issoudun (FR)

(73) Assignee: Safran Seats, Plaisir (FR)

( * ) Notice: Subject to any disclaimer, the term of this patent is extended or adjusted under 35 U.S.C. 154(b) by 186 days.

(21) Appl. No.: 15/734,438

(22) PCT Filed: Jun. 4, 2019

(86) PCT No.: PCT/EP2019/064522
§ 371 (c)(1),
(2) Date: Dec. 2, 2020

(87) PCT Pub. No.: WO2019/234041
PCT Pub. Date: Dec. 12, 2019

(65) Prior Publication Data
US 2021/0221516 A1  Jul. 22, 2021

(30) Foreign Application Priority Data
Jun. 5, 2018 (FR) ..................................... 1870648

(51) Int. Cl.
*B64D 11/06* (2006.01)
(52) U.S. Cl.
CPC ................................ *B64D 11/0606* (2014.12)
(58) Field of Classification Search
CPC . B64D 11/0023; B64D 11/0606; E06B 9/581; E06B 9/60; E06B 9/66
See application file for complete search history.

(56) References Cited

U.S. PATENT DOCUMENTS

| | | | |
|---|---|---|---|
| 670,239 A | * | 3/1901 | Kreh ...................... E06B 9/581 160/267.1 |
| 1,134,326 A | * | 4/1915 | Gambon ................... E06B 9/60 160/322 |

(Continued)

FOREIGN PATENT DOCUMENTS

| | | | |
|---|---|---|---|
| CN | 102317156 A | 1/2012 | |
| DE | 4203149 C1 | * 2/1993 | .......... E04F 10/0607 |

(Continued)

OTHER PUBLICATIONS

International Patent Application No. PCT/EP2019/064522, International Search Report (with English translation and Written Opinion, dated Aug. 9, 2019.

(Continued)

*Primary Examiner* — Joseph W Sanderson
(74) *Attorney, Agent, or Firm* — Kilpatrick Townsend & Stockton LLP

(57) ABSTRACT

A removable closure device for a space inside an aircraft includes:
  a frame comprising at least one upright said frame comprising at least one fixation interface including a structural element,
  a curtain assembly comprising a flexible curtain and
  at least one guiding device or ensuring a translational guiding of the flexible curtain with respect to the upright so that the flexible curtain s able to be moved in a direction of movement parallel to a longitudinal direction of the upright between a stowed position, in which the flexible curtain s released from the space, and a deployed position, in which the flexible curtain closes the space.

13 Claims, 14 Drawing Sheets

(56) References Cited

U.S. PATENT DOCUMENTS

| | | | | |
|---|---|---|---|---|
| 3,423,121 A * | 1/1969 | Martin | B64D 11/0023 | 160/35 |
| 4,252,172 A * | 2/1981 | Pommat | E06B 9/60 | 160/322 |
| 4,368,771 A * | 1/1983 | Hopper | E06B 9/78 | 160/121.1 |
| 5,161,593 A * | 11/1992 | Hirabayashi | E06B 9/58 | 160/310 |
| 5,601,133 A * | 2/1997 | Krupke | E06B 9/13 | 160/265 |
| 5,620,039 A * | 4/1997 | Delgado | E06B 9/581 | 160/265 |
| 5,632,317 A * | 5/1997 | Krupke | E06B 9/13 | 160/264 |
| 5,758,705 A * | 6/1998 | Wagner | E06B 9/581 | 160/310 |
| 5,887,637 A * | 3/1999 | Phyper | E06B 9/362 | 160/172 R |
| 6,019,156 A * | 2/2000 | Wagner | E06B 9/13 | 160/310 |
| 6,257,523 B1 * | 7/2001 | Olliges | B61D 17/048 | 244/129.5 |
| 6,691,761 B1 * | 2/2004 | Alkhoury | E06B 9/581 | 160/98 |
| 7,581,578 B2 * | 9/2009 | Coenraets | E06B 9/68 | 160/267.1 |
| 7,585,022 B2 | 9/2009 | Achilles et al. | | |
| 8,534,604 B2 * | 9/2013 | Savian | B64D 11/0641 | 244/118.6 |
| 8,616,643 B2 * | 12/2013 | Darbyshire | B64D 11/0641 | 297/340 |
| 8,752,607 B2 * | 6/2014 | Anderson | E06B 9/262 | 160/171 |
| 9,027,880 B2 | 5/2015 | Breuer et al. | | |
| 9,074,414 B1 * | 7/2015 | Steffi | E06B 9/66 | |
| 9,388,634 B2 * | 7/2016 | Hardison, III | E06B 9/86 | |
| 9,469,404 B2 * | 10/2016 | Darbyshire | B64D 11/064 | |
| 9,469,405 B2 * | 10/2016 | Henshaw | B64D 11/00153 | |
| 9,605,474 B1 * | 3/2017 | McCauley | E06B 9/40 | |
| 10,131,432 B2 * | 11/2018 | Simeon | B64D 11/0602 | |
| 10,562,633 B2 * | 2/2020 | Kuyper | B64D 11/0602 | |
| 10,914,117 B2 * | 2/2021 | Rejc | E05F 15/684 | |
| 11,312,497 B2 * | 4/2022 | Herault | B64D 11/0641 | |
| 11,591,090 B2 * | 2/2023 | Bonnefoy | B64D 11/0606 | |
| 11,623,750 B2 * | 4/2023 | Wisniewski | B64D 11/0606 | 244/118.6 |
| 2003/0127562 A1 * | 7/2003 | Pereira | B64C 1/1469 | 244/118.5 |
| 2003/0146654 A1 | 8/2003 | Nguyen et al. | | |
| 2005/0252623 A1 * | 11/2005 | McTavish | E06B 9/13 | 160/310 |
| 2008/0264582 A1 * | 10/2008 | Coenraets | E06B 9/40 | 160/319 |
| 2009/0302158 A1 * | 12/2009 | Darbyshire | B64D 11/064 | 244/118.6 |
| 2012/0248246 A1 * | 10/2012 | Savian | B64D 11/003 | 244/118.6 |
| 2012/0267060 A1 * | 10/2012 | Anderson | E06B 9/322 | 160/307 |
| 2012/0313406 A1 * | 12/2012 | Darbyshire | B64D 11/064 | 297/340 |
| 2013/0112354 A1 * | 5/2013 | Hardison, III | E06B 9/86 | 160/405 |
| 2014/0035330 A1 * | 2/2014 | Henshaw | B64D 11/06 | 297/217.3 |
| 2014/0084647 A1 * | 3/2014 | Darbyshire | B64D 11/0643 | 297/217.1 |
| 2015/0101764 A1 * | 4/2015 | Cheng | E06B 9/66 | 160/340 |
| 2016/0290043 A1 * | 10/2016 | McPherson, Jr. | E06B 9/56 | |
| 2016/0297530 A1 * | 10/2016 | Simeon | B64D 11/0602 | |
| 2017/0106980 A1 * | 4/2017 | Kuyper | B64D 11/0604 | |
| 2018/0258689 A1 * | 9/2018 | Rejc | E05D 15/242 | |
| 2019/0210733 A1 * | 7/2019 | Herault | B64D 11/0641 | |
| 2019/0315468 A1 * | 10/2019 | White | B64D 11/0601 | |
| 2019/0329891 A1 * | 10/2019 | Bonnefoy | B64D 11/0023 | |
| 2019/0344895 A1 * | 11/2019 | Kimizuka | B64D 11/0606 | |
| 2020/0130840 A1 * | 4/2020 | Frost | E05F 15/643 | |
| 2021/0163139 A1 * | 6/2021 | Bonnefoy | B64D 11/0606 | |
| 2021/0221516 A1 * | 7/2021 | Bonnefoy | B64D 11/0641 | |
| 2021/0380256 A1 * | 12/2021 | Wisniewski | B64D 11/0606 | |
| 2022/0274709 A1 * | 9/2022 | Bonnefoy | B64D 11/0023 | |

FOREIGN PATENT DOCUMENTS

| | | | | |
|---|---|---|---|---|
| DE | 102013114674 A1 * | 7/2014 | | E06B 9/42 |
| EP | 1598515 A1 * | 11/2005 | | E06B 9/13 |
| EP | 3225548 A1 | 10/2017 | | |
| KR | 20170100379 A * | 9/2017 | | E04F 10/0607 |
| WO | WO-8500633 A1 * | 2/1985 | | E06B 9/13 |
| WO | 2007072045 A2 | 6/2007 | | |
| WO | 2017066559 A1 | 4/2017 | | |
| WO | 2018033599 A1 | 2/2018 | | |
| WO | 2018093825 A1 | 5/2018 | | |

OTHER PUBLICATIONS

International Patent Application No. PCT/EP2019/064522, International Preliminary Report on Patentability, dated Dec. 8, 2020.
China Patent Application No. 201980037839.3, Office Action and Search Report, dated Apr. 27, 2023.

* cited by examiner

[Fig. 1a]
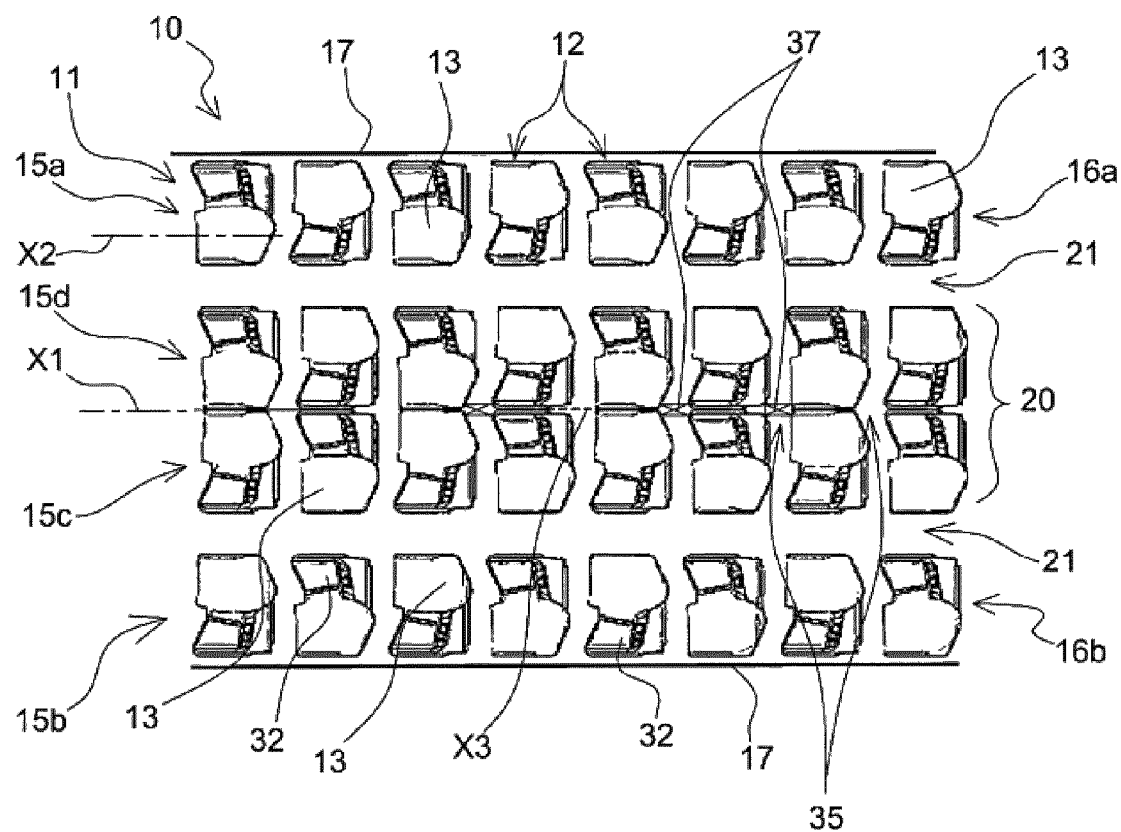

[Fig. 1b]
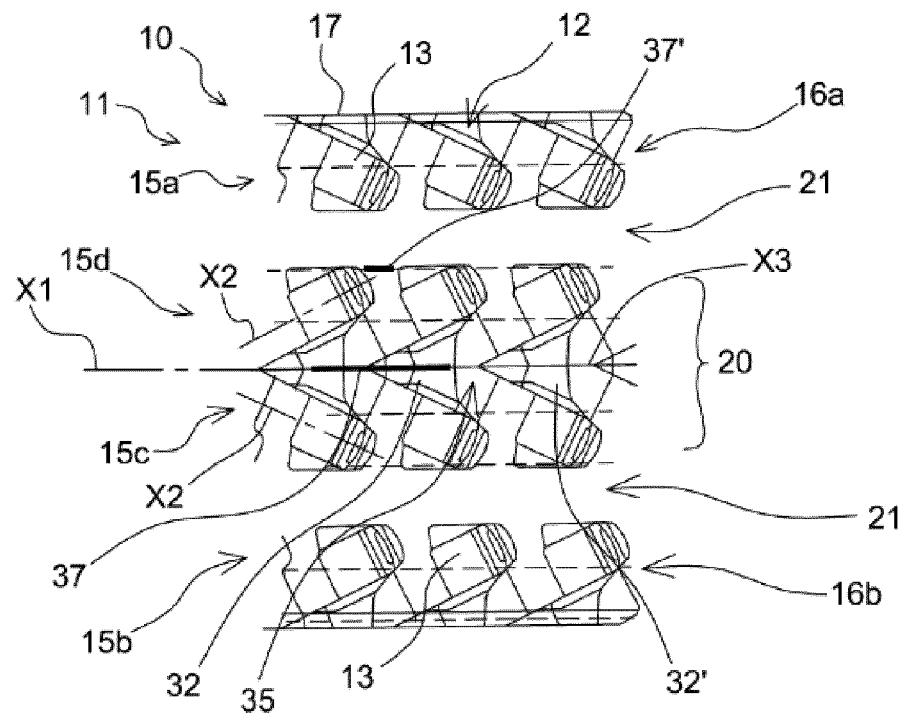
[Fig. 2a]
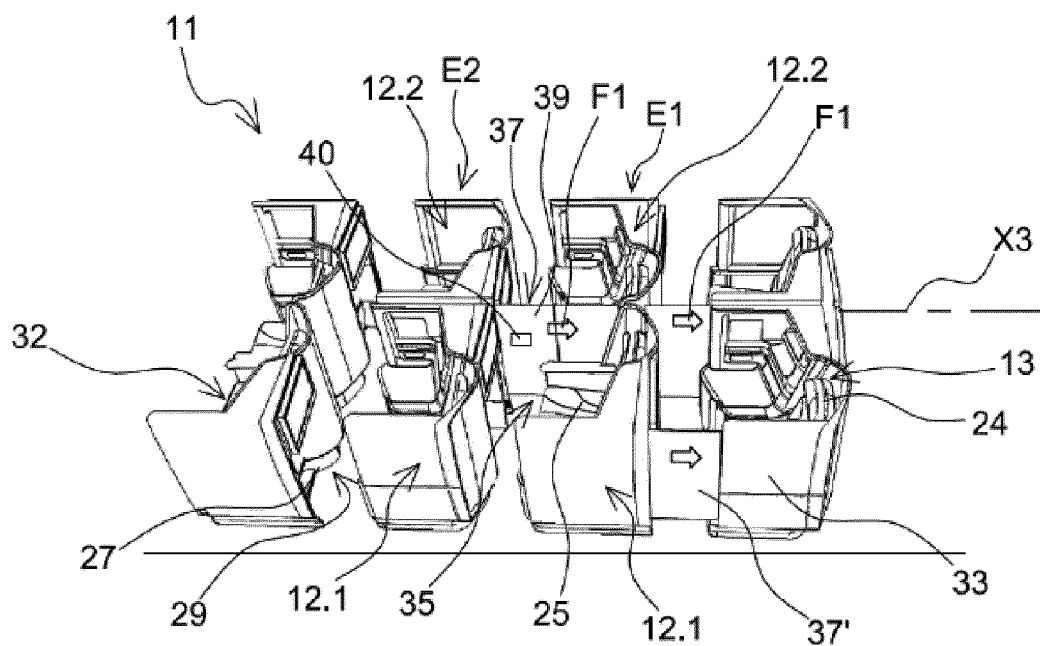

[Fig. 2b]
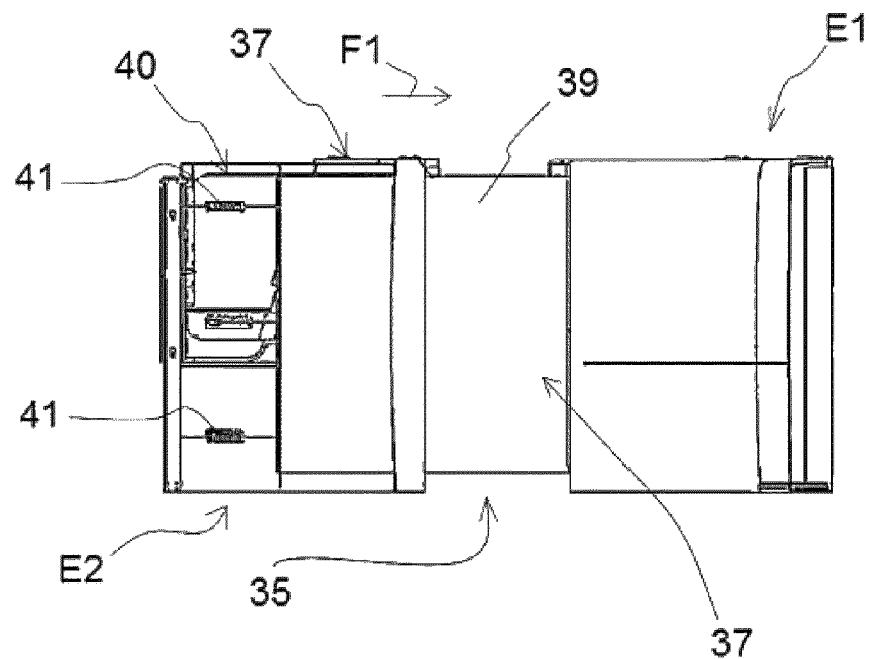
[Fig. 2c]
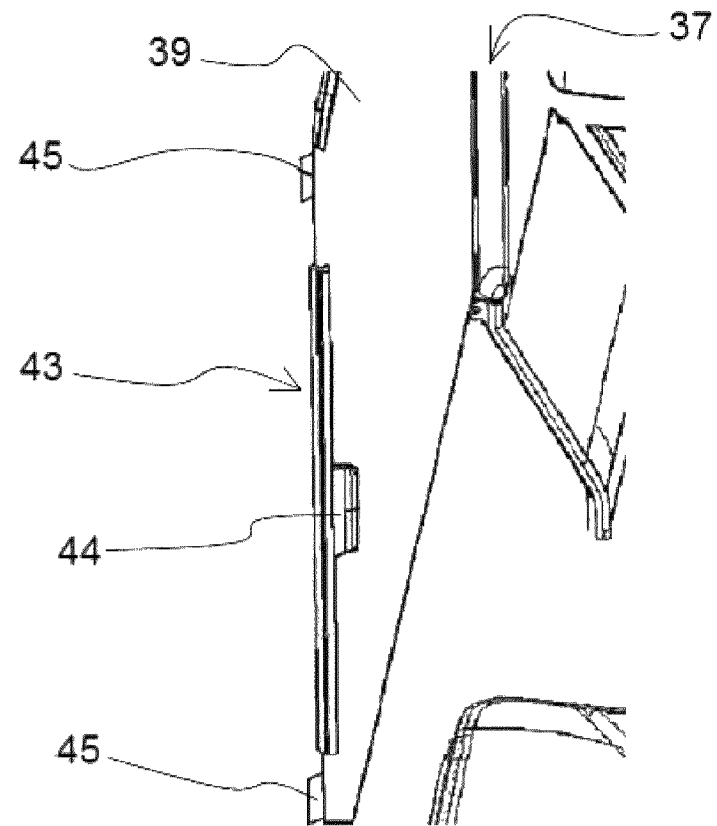

[Fig. 3]
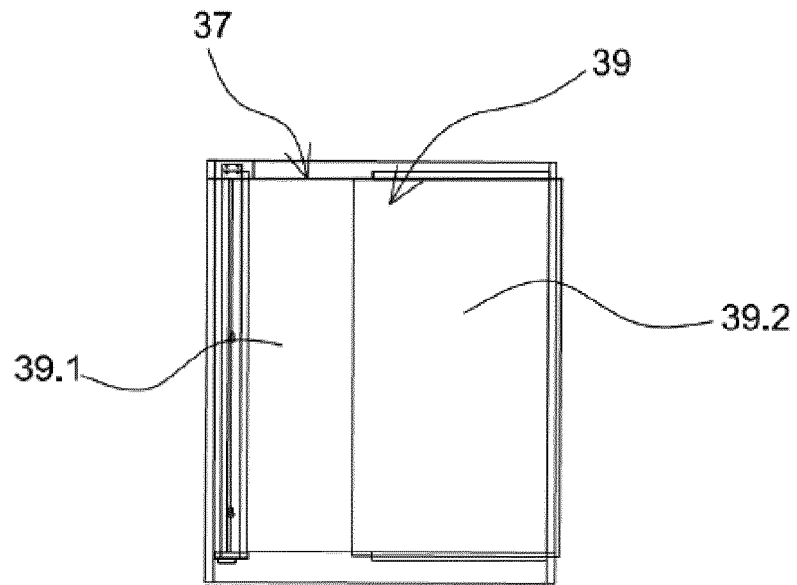
[Fig. 4]
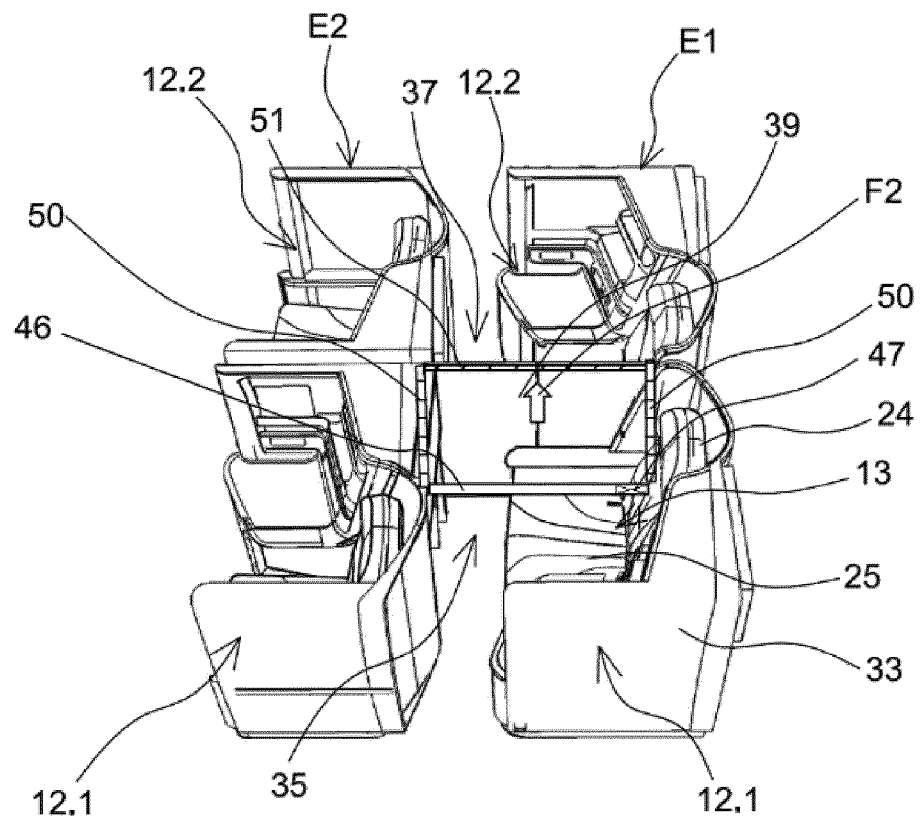

[Fig. 5]
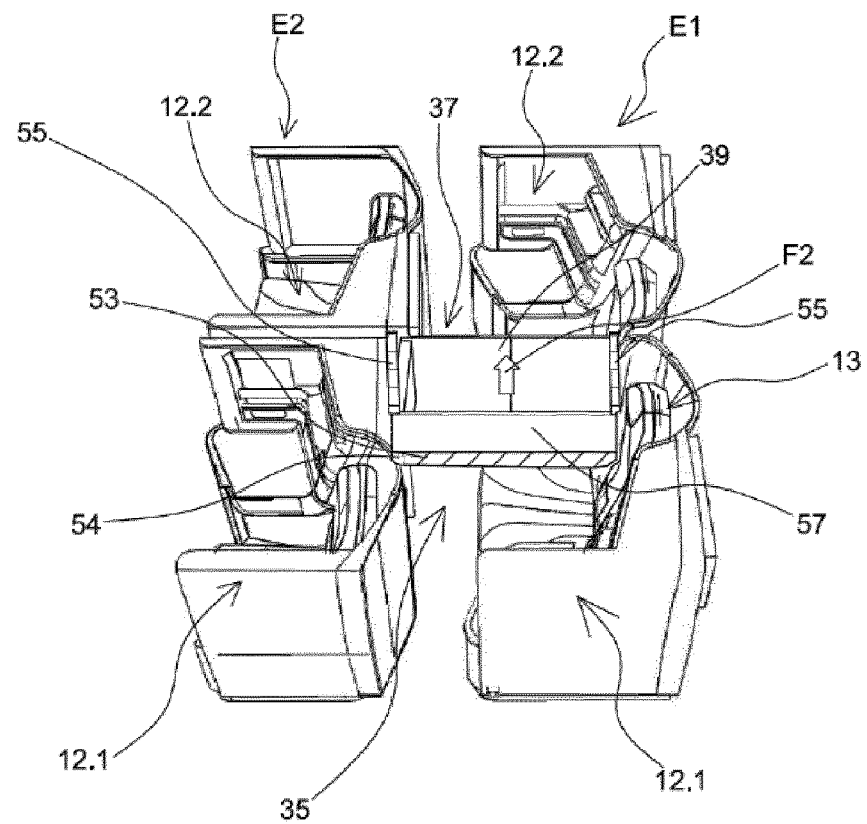
[Fig. 6]
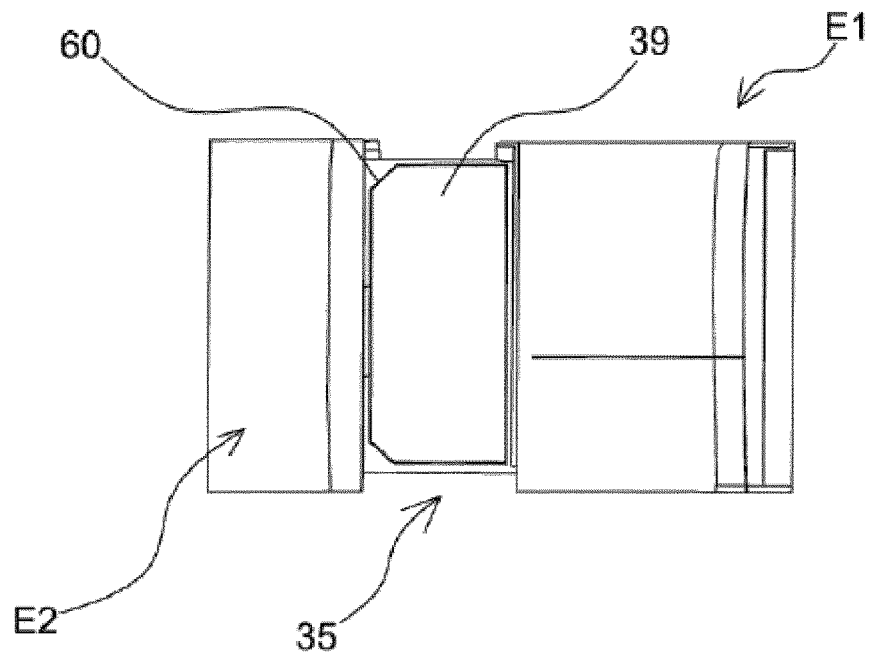

[Fig. 7a]
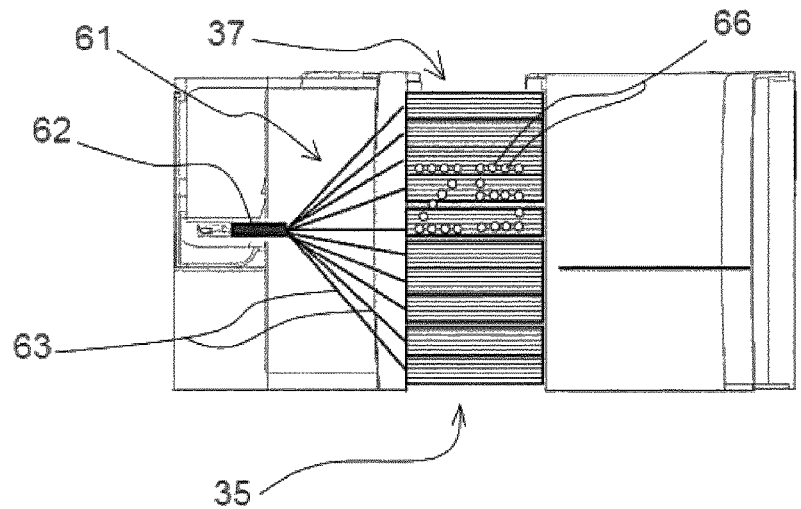
[Fig. 7b]
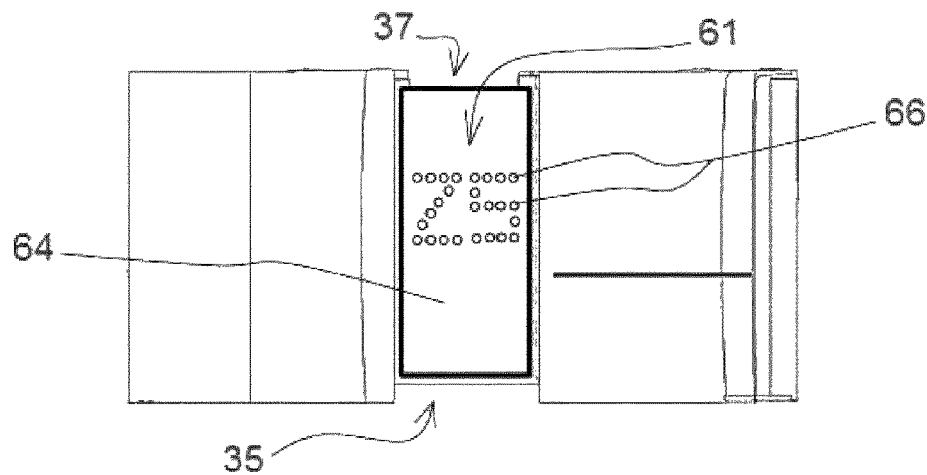
[Fig. 7c]
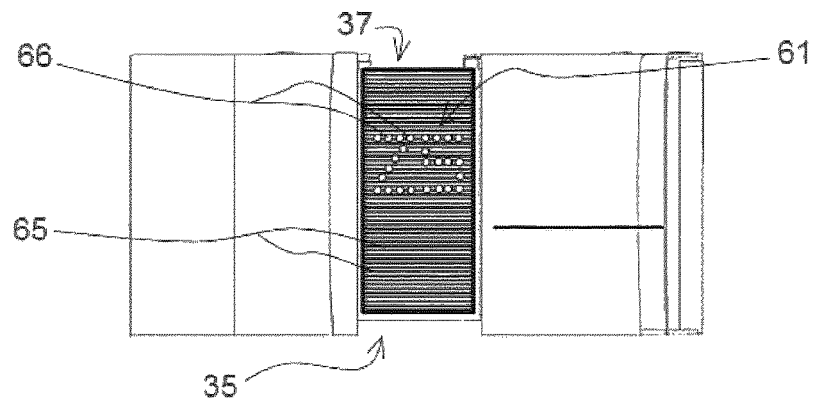

[Fig. 8]
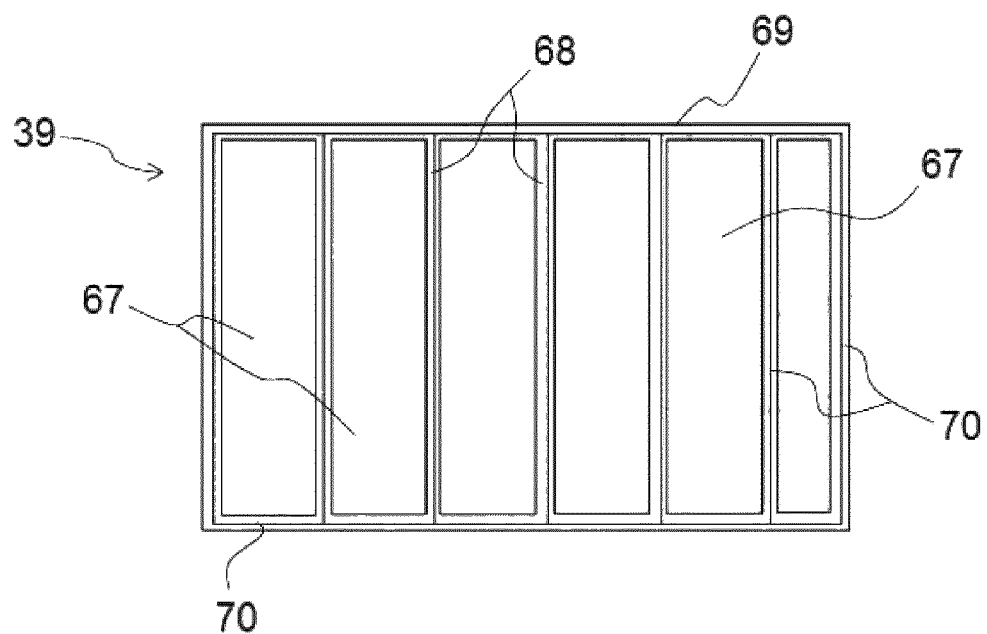
[Fig. 9]
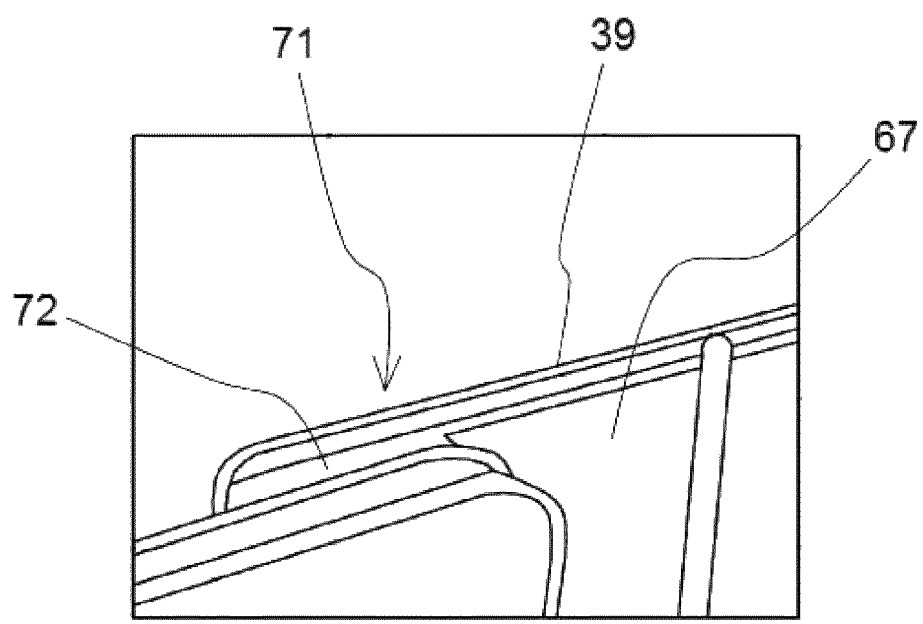

[Fig. 10]
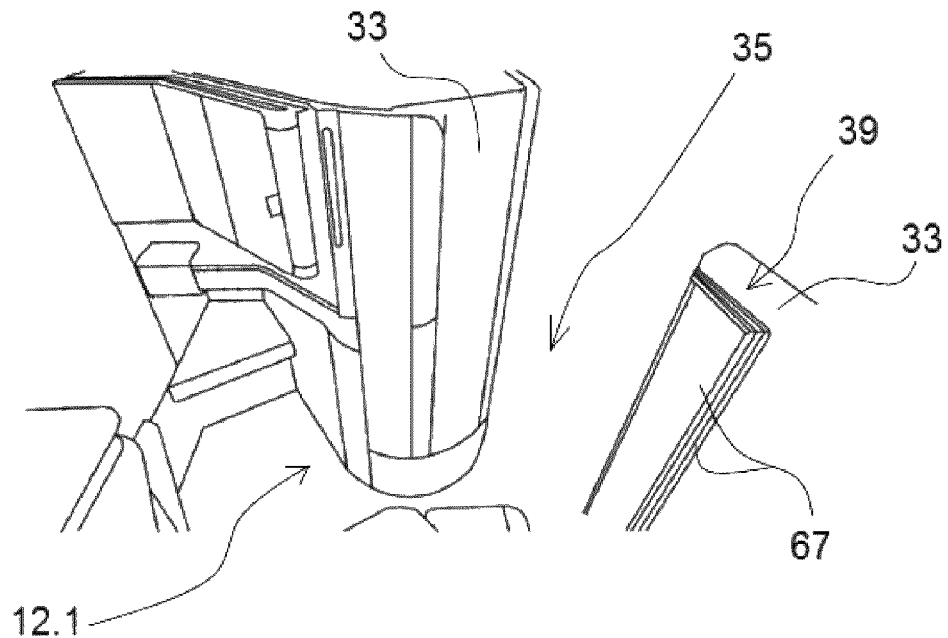
[Fig. 11]
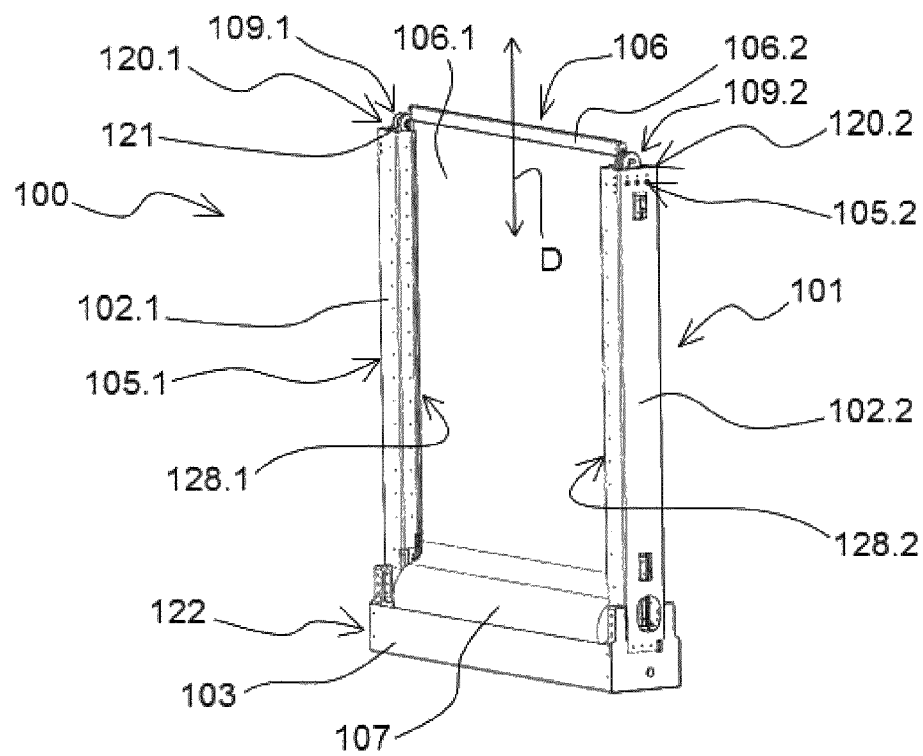

[Fig. 12]
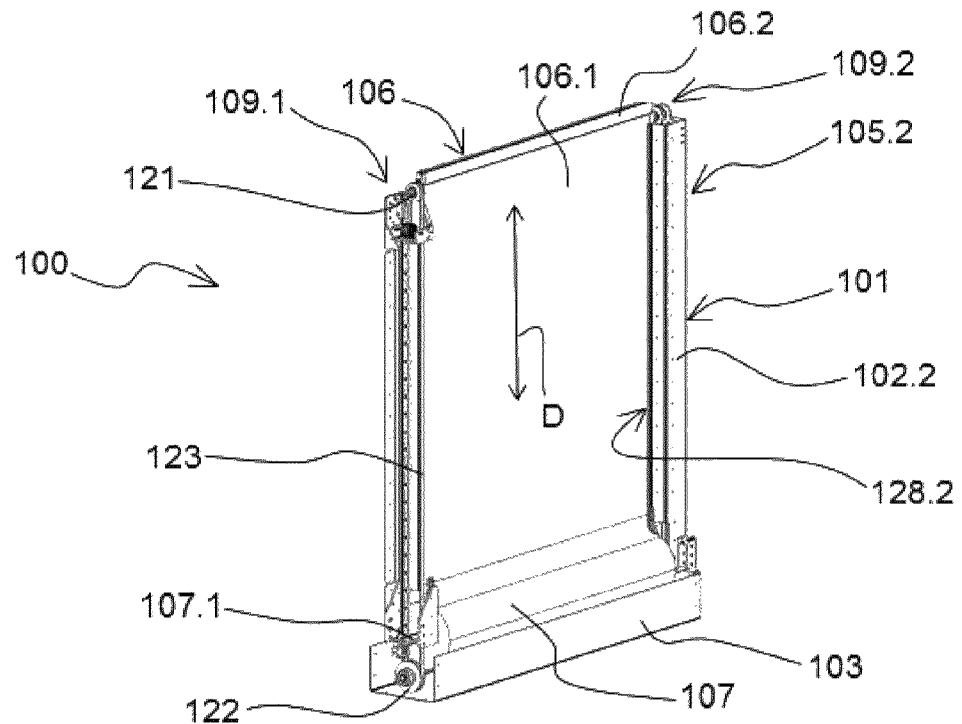
[Fig. 13a]
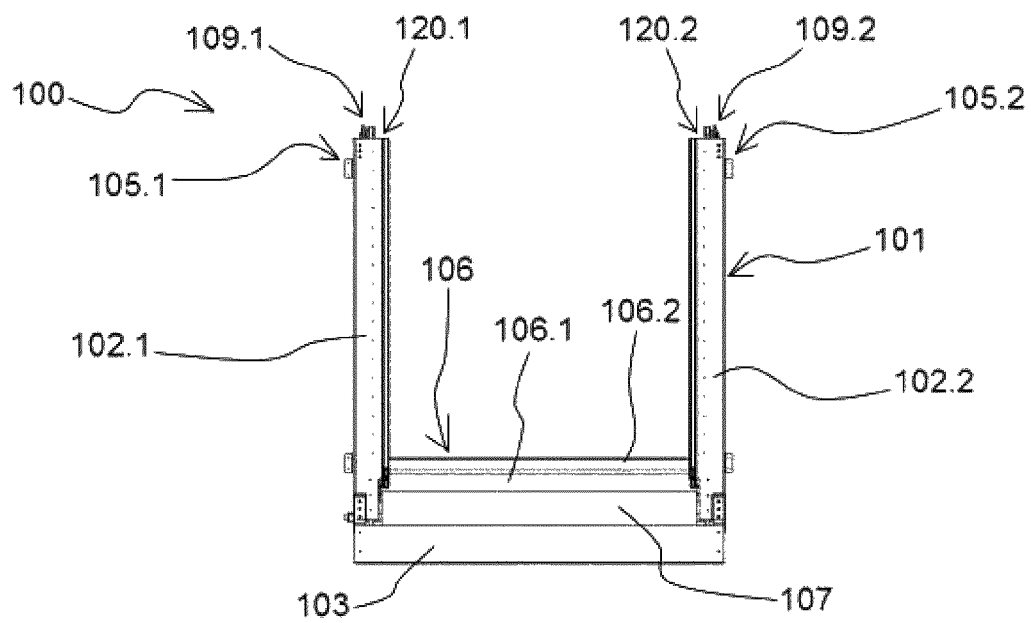

[Fig. 13b]
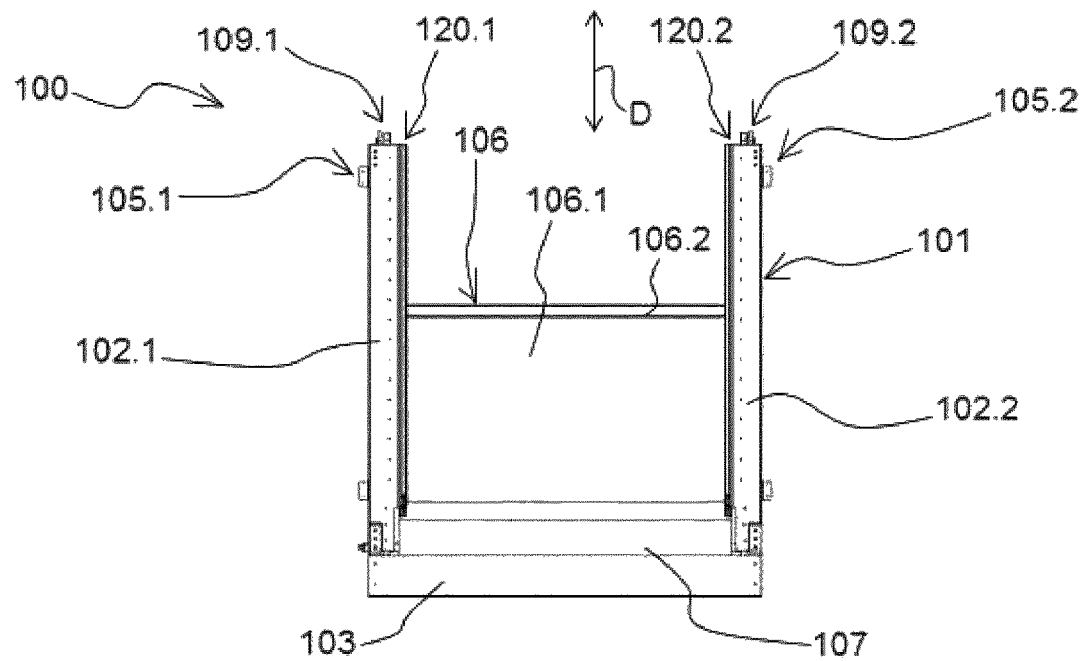
[Fig. 13c]
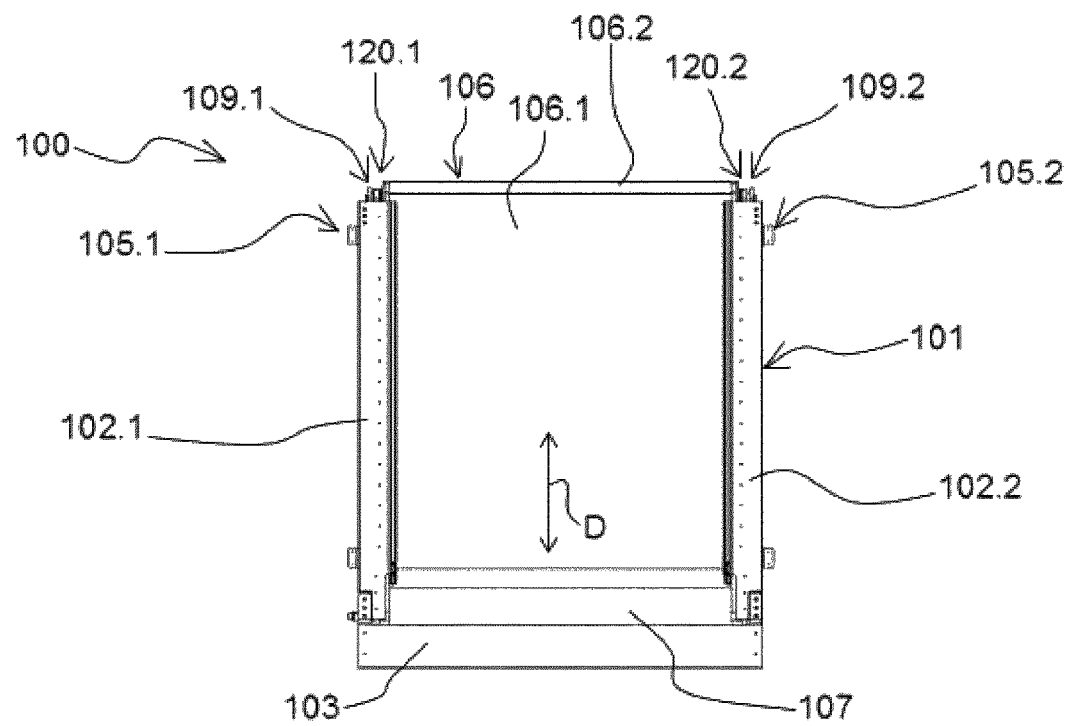

[Fig. 14]
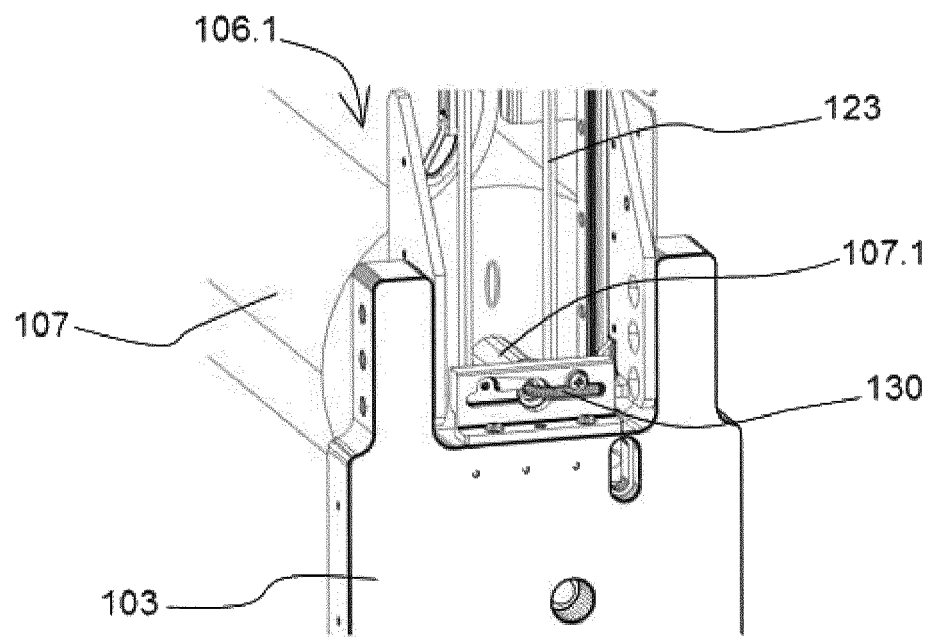
[Fig. 15]
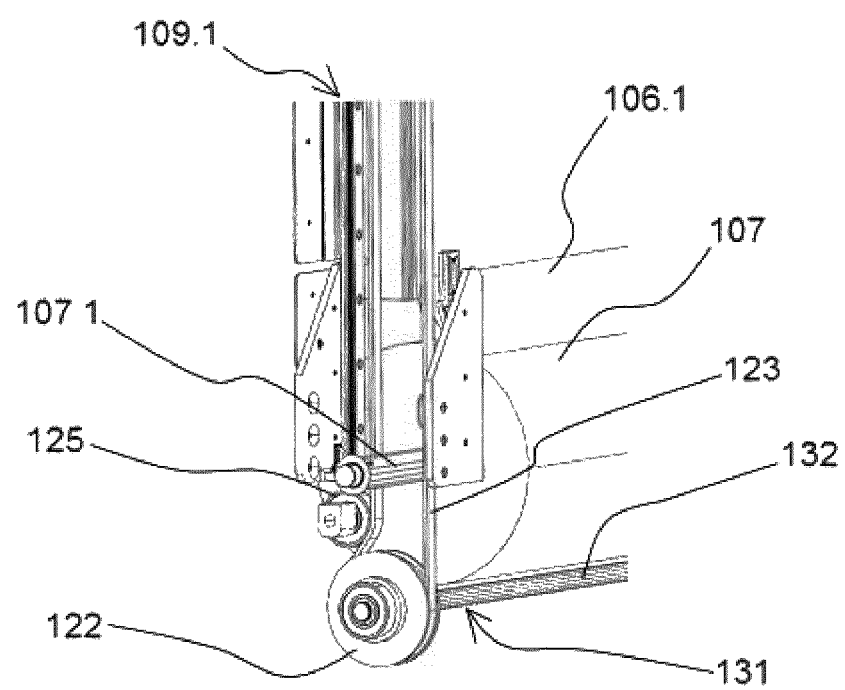

[Fig. 16]
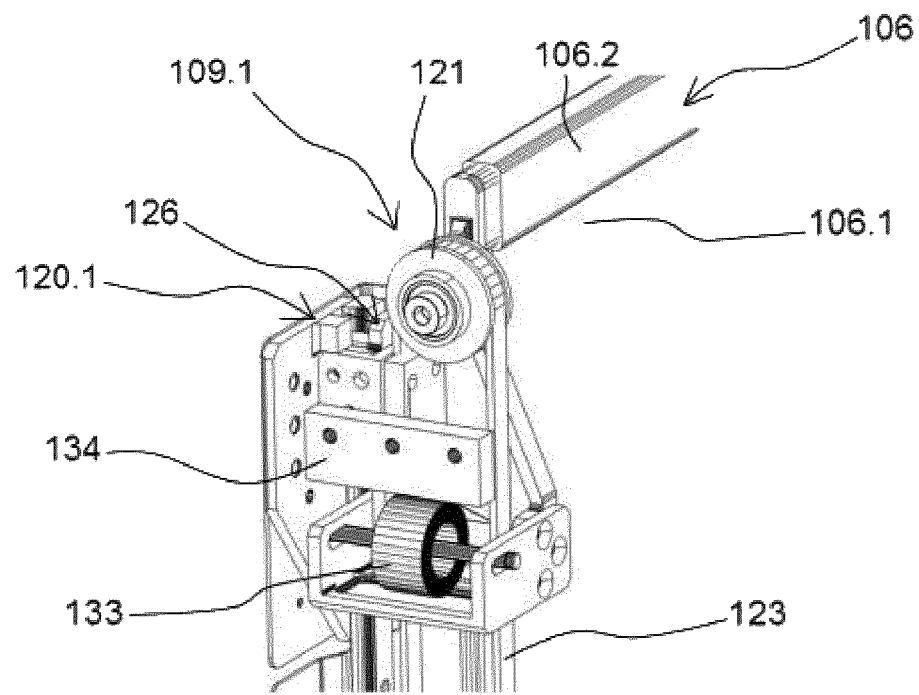
[Fig. 17a]
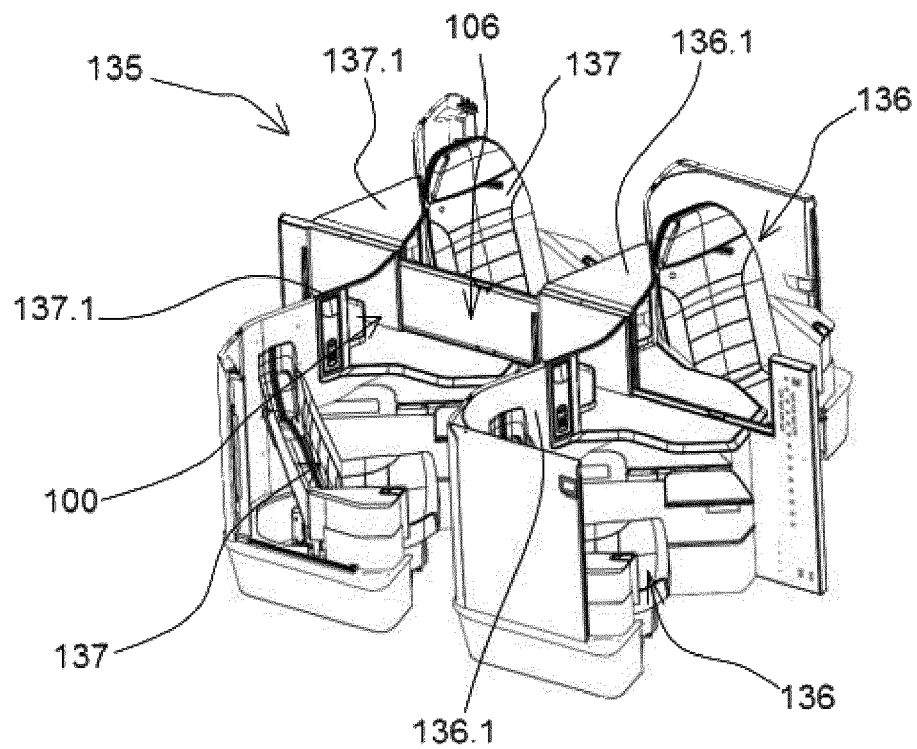

[Fig. 17b]
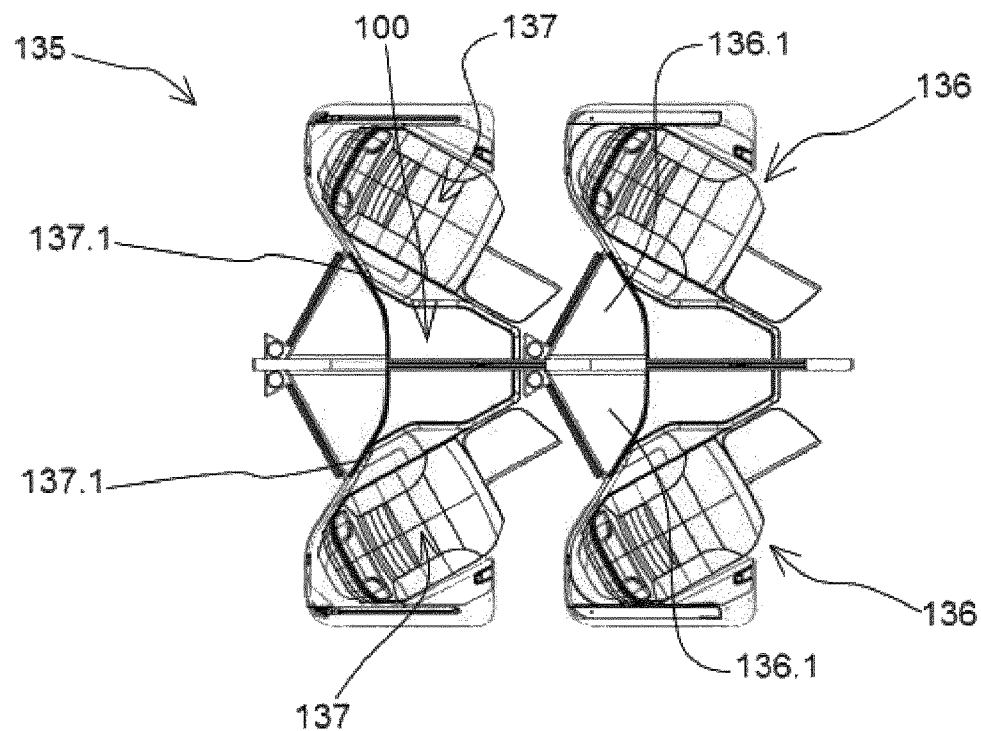
[Fig. 18]
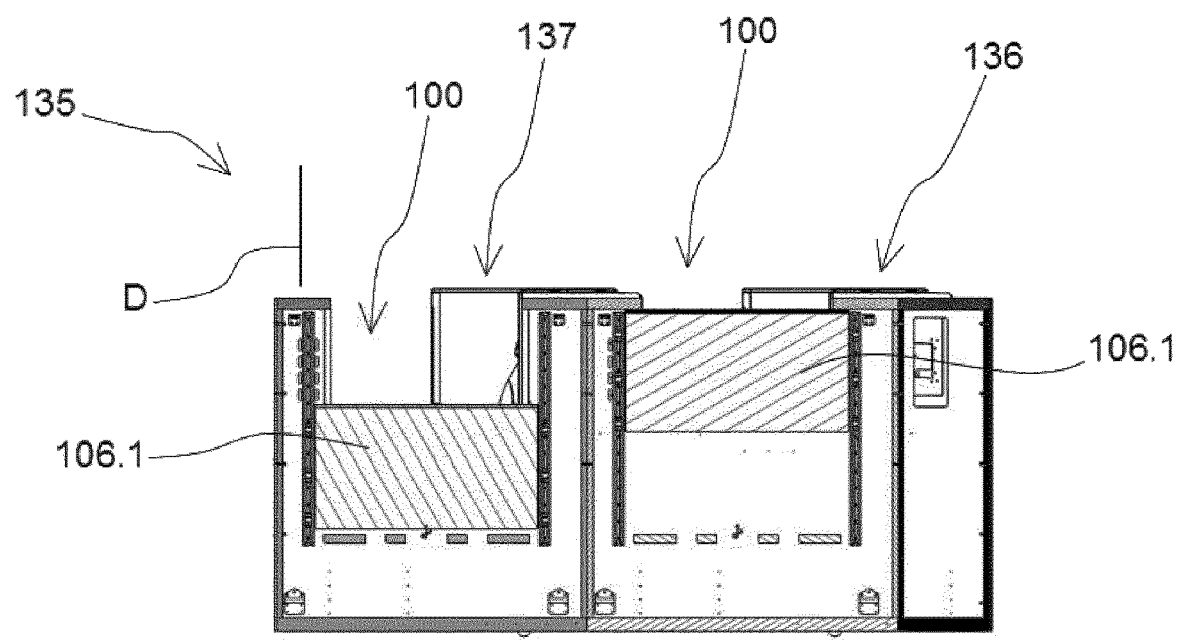

[Fig. 19]
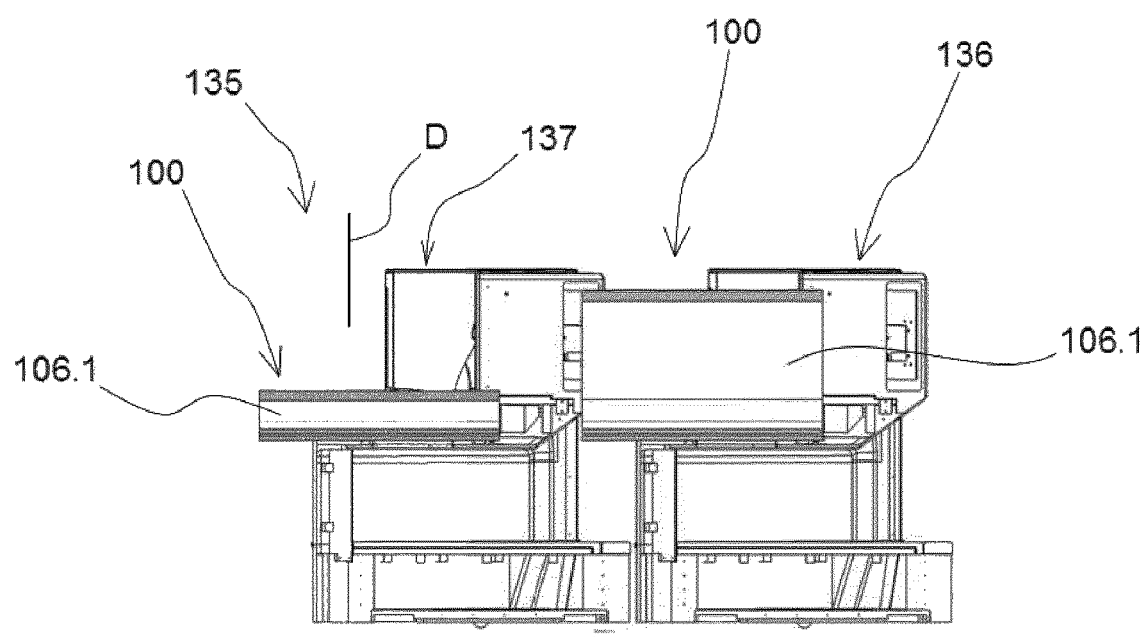

DEVICE FOR CLOSING A SPACE WITHIN AN AIRPLANE

The present invention relates to a device for closing a space inside an aircraft. The invention also relates to an arrangement of seats which provides comfort and safety as well as privacy for passengers.

Airplane seats of 'Business Class' type offer passengers different comfort positions, from a 'seating' position to a 'berth' position, in which the seat defines a substantially horizontal lying surface enabling the passenger to lie down.

Intermediate comfort positions are also available, such as the 'relaxation' position in which the backrest is very inclined. Generally, these intermediate positions are obtained by the inclination of the backrest pivoting about a horizontal axis and perpendicular to an axis of extension of the seat. The passenger can then remain in the seat during transitions between the different positions.

The berth generally comprises the backrest, the seat, a leg rest and a foot rest, the latter possibly being fixed or linked to the seat kinematics.

The invention aims to improve the privacy of a passenger by allowing him to isolate himself from his immediate neighbor. To this end, the invention relates to an arrangement of seats, notably to be installed in an aircraft cabin, characterized in that it comprises:
- at least one first assembly of seat units comprising a first seat unit and a second seat unit located side-by-side and respectively comprising a seat capable of passing from a 'sitting' position to a 'berth' position,
- at least one second assembly of seat units comprising a first seat unit and a second seat unit located side-by-side and respectively comprising a seat capable of passing from a 'sitting' position to a 'berth' position,
- a central space extending between the first assembly of seat units and the second assembly of seat units,
- and in that the arrangement of seats comprises at least partly flexible closure means, said closure means being movable between a stowed position, in which the closure means are released from the central space, and an extended position, in which the closure means close off the central space.

According to one embodiment, the central space is a communication passage for a person between the first seat unit and the second seat unit of the first assembly.

According to one embodiment, the central space extends above a continuous central console between the first assembly of seat units and the second assembly of seat units.

According to one embodiment, the closure means comprise a curtain, in particular made at least partly of fabric, and a return device for the curtain to the stowed position.

According to one embodiment, said arrangement comprises holding means for the curtain in the deployed position, such as a handle for cooperating with a support and/or a magnetic device.

According to one embodiment, the return device comprises at least one elastic return member, such as a spring.

According to one embodiment, the return device comprises a winder provided with an axis, on which at least part of the curtain is rolled up when the curtain is in the stowed position.

According to one embodiment, the winder is arranged horizontally in the lower part.

According to one embodiment, the winder incorporates an electric motor.

According to one embodiment, said arrangement comprises vertical uprights providing translational guidance for the curtain.

According to one embodiment, said arrangement comprises a guiding bar connecting the curtain to the vertical uprights.

According to one embodiment, said arrangement comprises a housing, in which the curtain is housed in the stowed position.

According to one embodiment, the housing protrudes from a floor of the aircraft.

According to one embodiment, said arrangement comprises means for stiffening the curtain, such as cords or a flexible plate.

According to one embodiment, said arrangement comprises means for generating a light pattern.

According to one embodiment, the means for generating a light pattern comprise a light source and translucent threads arranged in a thickness of the curtain.

According to one embodiment, the means for generating a light pattern comprise a light panel arranged inside the curtain.

According to one embodiment, the means for generating a light pattern comprise a lamp assembly, in particular of the LED type.

According to one embodiment, the closure means comprise a semi-flexible curtain having an alternation of blades and folding zones.

According to one embodiment, means, in particular of the magnetic type, are provided for holding the semi-flexible curtain in the stowed position and deployed position.

According to one embodiment, the closure means comprise a curtain, in particular made at least partly of sound-absorbing material.

The invention also relates to a removable closing device for a space inside an aircraft, characterized in that it comprises:
- a frame comprising at least one upright, said frame comprising at least one fixation interface including a structural element,
- a curtain assembly comprising a flexible curtain, and
- at least one guiding device capable of ensuring a translational guidance of the flexible curtain with respect to the upright, such that the flexible curtain can be moved along a direction of movement parallel to a longitudinal direction of the upright between a stowed position, in which the flexible curtain is released from the space, and an extended position, in which the flexible curtain closes off the space.

According to one embodiment, the device comprises a drum, on which the flexible curtain can be rolled up, so that the flexible curtain can be moved along the direction of movement between a stowed position, in which the flexible curtain is mostly rolled up on the drum, and an extended position, in which the flexible curtain is mostly unrolled from the drum.

According to one embodiment, the flexible curtain is fully movable in translation along the direction of movement, so that the flexible curtain extends in a plane in the stowed position and deployed position.

According to one embodiment, the flexible curtain can be moved along the direction of movement between a stowed position, in which the flexible curtain is accordion-folded, and an extended position, in which the flexible curtain extends in a plane.

According to one embodiment, the guiding device is a belt device.

According to one embodiment, the belt device comprises a first pulley rotatingly connected to the frame, a second pulley rotatingly connected to the frame, and a belt cooperating with the first pulley and the second pulley.

According to one embodiment, a connecting device provides a connection between the belt and the curtain assembly.

According to one embodiment, the device comprises a spring for assisting the deployment of the flexible curtain.

According to one embodiment, the spring for assisting the deployment of the curtain is a torsion spring having one end fixed to the frame and one end fixed to a pulley.

According to one embodiment, the device comprises a curtain return spring configured to tension the curtain, when the latter is in the deployed position.

According to one embodiment, the device comprises at least one rotating roller capable of rolling along a wall of the upright, when the curtain is moved from one position to another.

According to one embodiment, the device comprises a stop, with which the rotating roller comes into contact, when the curtain is in the deployed position.

According to one embodiment, the upright defines a housing, in which the guiding device is at least partially arranged.

According to one embodiment, the curtain assembly comprises a rigid transversal bar fixed to one end of the flexible curtain.

According to one embodiment, one end of the transversal bar is able to slide inside a groove made in the upright.

According to one embodiment, the frame is provided with a first upright and a second upright connected to one another by a box, in which the drum is at least partially arranged.

The invention also relates to an assembly of aircraft seats comprising:
- a front seat associated with a front shell and a rear seat associated with a rear shell, and
- a removable closure device as defined above arranged between the front seat and the rear seat.

According to one embodiment, the removable closure device includes a frame having a first upright provided with a fixation interface for ensuring a fixation between the first upright and the front shell of the front seat and a second upright provided with a fixation interface for ensuring a fixation between the second upright and the rear shell of the rear seat.

The invention also relates to an aircraft comprising an assembly of seats as defined above.

Of course the different characteristics, variants and/or embodiments of the present invention can be associated with each other in various combinations as long as they are not incompatible or exclusive from each other.

The present invention will be better understood and other characteristics and advantages will become more apparent from the following detailed description including embodiments given by way of illustration with reference to the appended figures, which are non-limiting examples for the understanding of the present invention and the description of its implementation and, where appropriate, contribute to its definition, in which:

FIGS. 1a and 1b are schematic top views of aircraft cabins incorporating different alternative embodiments of an arrangement of seats according to the present invention;

FIG. 2a is a perspective view illustrating a first embodiment of the closure means according to the invention;

FIG. 2b is a side view of the closure means comprising a spring return device;

FIG. 2c is a perspective view of a handle used to move the curtain according to the invention from a stowed position to an deployed position;

FIG. 3 is a side view illustrating the structure of a curtain forming the closure means according to the invention;

FIG. 4 is a perspective view illustrating a second embodiment of the closure means according to the invention;

FIG. 5 is a perspective view illustrating a third embodiment of the closure means according to the invention;

FIG. 6 is a side view of an assembly of two seats showing the integration of stiffening means inside the curtain according to the present invention;

FIGS. 7a, 7b, and 7c are views illustrating three embodiments of means for generating a light pattern in the closure means according to the present invention;

FIG. 8 is a front view of the various elements forming a semi-flexible curtain according to the present invention;

FIG. 9 is a detailed view of the magnetic holding means for the semi-flexible curtain in the deployed position;

FIG. 10 is a perspective view of a semi-flexible curtain having an accordion configuration in the stowed position;

FIG. 11 is a perspective view of a removable closure device for closing a space according to the present invention;

FIG. 12 is a perspective view of the closure device in FIG. 11 without the upright so as to show the device for guiding the curtain in translation;

FIGS. 13a, 13b, 13c are front views of a removable closure device according to the invention respectively in the stowed position, in an intermediate position, and in a deployed position;

FIG. 14 is a perspective view of the lower part of the removable closure device according to the invention showing the return spring for the curtain;

FIG. 15 is a perspective view of the lower part of the removable closure device according to the invention showing the spring for assisting the deployment of the curtain;

FIG. 16 is a perspective view of the upper part of the removable closure device according to the invention showing the connection device between the curtain and the belt of the guiding device;

FIGS. 17a and 17b are respectively perspective and top views illustrating the integration of a removable closure device according to the invention in an assembly of aircraft seats;

FIG. 18 is a side view illustrating an alternative embodiment of the removable closure device according to the invention respectively in the stowed position and in the deployed position;

FIG. 19 is a side view illustrating another variant embodiment of the removable closure device according to the invention respectively in the stowed position and in the deployed position.

It should be noted that, in the figures, the structural and/or functional elements common to the different embodiments may have the same references. Thus, unless otherwise stated, such elements have identical structural, dimensional and material properties.

The relative terms of the 'horizontal' or 'vertical' type are understood by reference to a removable closure device according to the invention in the position of use.

FIG. 1a shows an aircraft cabin 10 extending along a longitudinal axis X1 and comprising a arrangement of seats 11. The arrangement of seats 11 according to the present invention comprises a plurality of seat units 12 respectively comprising an individual seat 13. Advantageously, the seat 13 is able to move from a "seating" position, corresponding to the position used in particular during the stopping, take-off, and landing phases of the airplane, and a 'bert' position, in which the seat 13 defines a substantially horizontal sleeping surface for the passenger. In particular, the 'seating' position and the 'berth' position correspond to configurations of the seat 13 in two extreme positions. According to variant embodiments, the seat 13 may also take intermediate positions, called relaxation positions, between these two extreme positions.

The plurality of seat units 12 are arranged in at least one row 15a preferably extending along the longitudinal axis X1 of the aircraft cabin 10. According to the example shown in FIGS. 1a and 1b, the plurality of seat units 12 are arranged in four rows 15a, 15b, 15c, and 15d.

According to various particular embodiments, within the row 15a, respectively the rows 15a, 15b, 15c and 15d, the seat unit 12 can be oriented such that the seat 13 is facing the front and/or rear of the aircraft. The seats 13 can form a non-zero angle with respect to the longitudinal axis X1 as indicated in more detail below.

It should be noted that the terms 'front' and 'rear' used in connection with the expression 'seat unit' locally define a relative position of the seat 13 inside the row 15a, respectively the rows 15a, 15b, 15c and 15d, and do not refer in any way to an orientation of the seat 13 inside the aircraft cabin 10. In other words, the expression 'front seat unit' means that the seat unit is directly positioned in front of another seat unit inside the row, while the term 'rear seat unit' means that the seat unit is directly positioned behind another seat unit inside of the row.

According to the exemplary embodiment, the arrangement of seats 11 comprises two side groups 16a, 16b comprising seat units 12. The two side groups 16a, 16b are each formed respectively by a row 15a, 15b of seat units 12 positioned along a side wall 17 of the fuselage of the aircraft cabin 10. The arrangement of seats 11 also includes a central group 20. The central group 20 preferably comprises two rows 15c, 15d of seat units 12. In such an arrangement, the two rows 15c, 15d of seat units 12 are laterally contiguous to one another.

The side groups 16a, 16b are respectively separated from the central group 20 by a aisle 21. According to the configuration in FIG. 1a, two aisles 21 are therefore provided in the aircraft cabin 10, specifically between each side group 16a, 16b and the central group 20. As a variant, the two side groups 16a, 16b could each be formed by several rows of seat units 12.

Each seat 13 has an axis of extension X2 substantially corresponding to a direction of longitudinal extension of the seat 13. In particular, the axis of extension X2 corresponds to the direction of longitudinal extension of the seat 13 in the 'berth' position. In the present example, the axis X2 is substantially parallel to the longitudinal axis X1 of the aircraft cabin, that is to say that it forms an angle of less than 10 degrees with respect to the axis X1.

As a variant, as shown in FIG. 1b, the axis of extension X2 of a seat forms a non-zero angle greater than 10 degrees with respect to the longitudinal axis X1 of the aircraft cabin 10. It is then possible to define herringbone seat configurations, in which the two seat units 12 form a "V". The seat units 12 could be turned towards the inside of the assembly as it is the case in FIG. 1b, so that the tip of the 'V' shape is located in front of the seat units. Alternatively, the seat units 12 face an adjacent aisle 21 so that the tip of the 'V' shape is located behind the backrests 24 of the seats 13 ('reverse herringbone' configuration). In such an arrangement, each passenger has direct access to the aisle 21 from the seat 13.

The optimization of the density of the aircraft cabin 10 with respect to a width of the latter is notably possible by modifying the angle of the axis of extension X2 of the seats 13 with respect to the longitudinal axis X1 of the aircraft cabin 10.

According to various embodiments, the axes of extension X2 of the seats 13 can form substantially the same angle with respect to the longitudinal axis X1 of the aircraft cabin 10. In addition, the axes of extension X2 of two adjacent seats of the central group 20 can intersect the longitudinal axis X1 of the aircraft cabin 10 at substantially the same point. Alternatively, the two laterally adjacent seats 13 can be offset from each other along the longitudinal axis X1, so that the axes of extension X2 of the two laterally adjacent seats 13 intersect the longitudinal axis X1 at different points.

As it is particularly illustrated in FIG. 2a, each seat unit 12 comprises a seat 13 having a backrest 24, in particular adjustable in inclination, and a seat 25, in particular potentially adjustable in inclination. In addition, the seat 13 may include a leg rest (not shown), in particular adjustable in inclination. In addition, the seat unit 12 may include a foot rest 27.

The foot rest 27 may comprise a fixed cushion, in particular arranged in a housing 29 for receiving the feet of the passenger. Preferably, the foot rest 27 is located in the extension of the seat 13 when the latter is in the 'berth' position.

The seat unit 12 may also include a side console 32, which can in particular be used as a fixed shelf and/or to store a meal shelf.

The seat unit 12 can also include a fixed shell 33 for separation. Such a fixed shell 33 therefore makes it possible to guarantee the privacy of each passenger. Advantageously, in order to fulfill such a privacy function, the fixed shell 33 extends around the backrest 24 of the seat 13 in order to create an interior space, partially closed, in which the seat 13 is arranged.

When two seat units 12 are arranged behind one another, the two seat units 12 are advantageously arranged so as to define an at least partially vertical overlap between them. The vertical overlap between the two seat units 12 may consist, as shown, in positioning of the housing 29 of the foot rest 27 of the 'rear' seat unit 12 under the side console 32 of the 12 corresponding 'front' seat unit.

There are also a 'left' seat unit 12, in which the side console 32 is arranged to the left of the seat 13, and a 'right' seat unit 12, in which the side console 32 is arranged to the right of the seat 13. A row 15a, 15b, 15c, 15d is formed by alternating "left" seat units 12 and "right" seat units 12, so that each seat 13 of a rear seat unit 12 is located in front of a side console 32 of the front seat unit 12 comprising the housing 29 of the corresponding foot rest 27.

As shown in particular in FIGS. 2a, 4, and 5, the arrangement 11 comprises at least a first assembly E1 of rear seat units comprising a first seat unit 12.1 and a second seat unit 12.2 located side-by-side. The seat units 12.1 and 12.2 of the assembly E1 belong to two different rows 15c, 15d. The seat units 12.1, 12.2 of the assembly E1 are laterally attached to one another while being contiguous or separated from each other by a maximum of a few centimeters.

A second assembly E2 of front seat units comprises a first seat unit 12.1 and a second seat unit 12.2 located side-by-side. The seat units 12.1 and 12.2 of the assembly E2 belong to two different rows 15c, 15d. The seat units 12.1, 12.2 of the assembly E2 are laterally attached to one another while being contiguous or separated from each other by a maximum of a few centimeters.

The seat units 12.1 and 12.2 of a given assembly E1, E2 are of the same 'left' or 'right' type.

A central space 35 extends between the first assembly E1 of seat units and the second assembly E2 of seat units. This central space 35 extends along an axis X3 of the assembly E1, in particular an axis of symmetry of the assembly E1.

In the embodiment in FIG. 1a, the central space 35 is a passage for a person allowing communication between the first seat unit 12.1 and the second seat unit 12.2 of the first assembly E1. The central passage 35 extends between the shells 33 of the seat units of the assembly E1 and the seat units 12 of the assembly E2. In this case, closure means 37 described in more detail below extend along a height of the seat in the deployed position.

Alternatively, in the embodiment in FIG. 1b, the central space 35 extends above a continuous central console 32' between the first assembly of seat units E1 and the second assembly of seat units E2. In this case, the closure means 37 are arranged above the central console 32'.

The closure means 37 arranged along the central space 35 are suitable for closing the central space 35. Said at least partially flexible closure means 37 are movable between a stowed position, in which the closure means 37 are released from the central space 35, and an extended position, in which the closure means 37 close off the central space 35. The closure means 37 then extend along the axis X3 of the assembly E1. Consequently, the passenger in a seat 13 of the assembly E1 is separated from the immediate neighbor by the closure means 37. The passenger is thus seated in a privacy zone defined by the enclosed space thus created by the shell 33 and the closure means 37.

In the embodiment in FIGS. 2a, 4, and 5, the closure means 37 comprise a curtain 39, in particular out of fabric, and a return device 40 for the curtain 39 into the stowed position. As it can be seen in FIG. 3, the curtain 39 may include a first part 39.1 out of a thin fabric, called the technical part, and a second part 39.2 out of a thick material attached to the first part 39.1 for example by means of a seam on this first part 39.1. The second part 39.2 is thicker than the first part 39.1, this is the reason why the terms 'thin' and 'thick' must be understood in relation to the thickness of these two parts 39.1 and 39.2. The second part 39.2 is called the aesthetic part because it may present patterns, such as for example the logo of an airline. The second part 39.2 could be for example out of fabric, alcantara, or leather to increase the perceived quality of the whole. The curtain 39 may be at least partially made out of an acoustic absorption material.

In the embodiment in FIG. 2a, the return device 40 comprises at least one elastic return member 41, such as a spring. In the example shown in FIG. 2b, two springs 41 are used, each fixed on the one hand to an assembly of seats E1 or E2 and on the other hand to the curtain 39. The curtain 39 can be deployed horizontally along the arrow F1.

The curtain 39 further comprises means 43 for holding said curtain 39 in the deployed position. As shown in FIG. 2c, these holding means 43 comprise for example a handle 44 forming a hook for cooperating with a fixed support, in particular in the form of a angle bracket. One or more magnetic holding devices 45 can also be used in combination. The holding means 43 may include a mechanical fuse making it possible to free the central space 35 when a limit force is applied to the holding means 43. Alternatively, the curtain 39 may include fusible seams.

In the embodiment in FIG. 4, the return device 40 comprises a winder 46 provided with an axis on which at least a part of the curtain 39 is rolled up, when the curtain 39 is in the stowed position.

The winder 46 is arranged horizontally in the lower part, in particular on the floor. The winder 46 makes it possible to release a maximum of space between the central passengers, when the curtain 39 is down in the stowed position. Alternatively, the winder 46 extends above a central console 32' separating the seat units 12.1, 12.2 from the assembly E1 (cf. FIG. 1b).

The winder 46 can integrate an electric motor 47 associated with a belt system.

Vertical uprights 50 provide translational guidance of the curtain 39 from top to bottom and vice versa. The connection between the uprights 50 and the curtain 39 is of the male/female type, or is a sliding connection, or is a toothed belt connection including a pinion in the case of an electric motor.

A guiding bar 51 can connect the curtain 39 to the uprights 50. The guiding bar 51 extends horizontally at one end of the curtain 39. The curtain 39 can be deployed vertically along the arrow F2.

In the embodiment in FIG. 5, the return device 40 comprises a winder 53. The winder 53 is arranged horizontally in the lower part. The winder 53 makes it possible to open up a maximum of space between the central passengers, when the curtain 39 is down in the stowed position.

The winder 53 can integrate an electric motor 54 associated with a belt system.

Vertical uprights 55 provide translational guidance of the curtain 39 from top to bottom and vice versa.

The connection between the uprights 55 and the curtain 39 is of the male/female type, or is a sliding connection, or is a toothed belt connection including pinion in the case of an electric motor.

Advantageously, the curtain 39 is housed in the stowed position in a rigid housing 57. This housing 57 extends horizontally along the axis X3 of the assembly E1. This housing 57 protrudes from the floor of the aircraft so as to form a separating wall between the passengers. This prevents interference between the feet of neighboring passengers. Unlike the embodiment in FIG. 4, the curtain 39 is not rolled up in the stowed position but extends in a plane. The curtain 39 can be deployed vertically along the arrow F3.

As it can be seen in FIG. 6, the curtain 39 may include stiffening means 60, such as cords and/or rigid edges and/or a rigid or semi-rigid plate. These means 60 may extend along an outline of the curtain 39.

In the embodiment in FIGS. 7a, 7b, and 7c, the curtain incorporates means 61 for generating a light pattern. These means 61 may include a light source 62 and translucent wires 63 arranged in a thickness of the curtain 39, as illustrated in FIG. 7a, or a light panel 64, preferably flexible, placed inside or on the curtain 39, as shown in FIG. 7b. Alternatively, it is possible to use an assembly of lamps 65, in particular of the LED type, as illustrated in FIG. 7c. A configuration of perforations 66 in the curtain 39 will allow the desired pattern to appear.

In the embodiment in FIGS. 8 to 10, the closure means 37 comprise a semi-flexible curtain 39 having an alternation of vertical blades 67 and folding zones 68. The semi-flexible curtain 39 is at least partially foldable along the zones 68.

The semi-flexible curtain 39 is formed by a plurality of blades 67 regularly spaced from one another and covered by the fabric 69, the portions of the fabric extending between two adjacent blades 67 forming the folding zones 68. Glue 70 can be placed between the blades 67 and over the entire outline of the fabric to ensure the assembly of two layers of fabric, between which the blades 67 are held. The blades 67 can be out of a rigid or semi-rigid plastic material.

As it can be seen in FIG. 9, one can use means 71 for holding the curtain 39 in the stowed position and in the deployed position, in particular of the magnetic type. It is thus possible to use a magnet 72 to produce a magnetic bonding of the free end edge of the curtain 39 to a fixed metal support integral with a seat unit 12.

The semi-flexible curtain 39 can be configured so that the vertical blades 67 are folded over one another in the stowed position, as shown in FIG. 10. The curtain 39 then has an accordion structure, in which the blades 67 are superimposed on each other over the majority of their surface. As a variant, the blades 67 could be oriented horizontally.

A closure device 37' similar to the device 37 can be installed for removably closing the passage on the side of the corridor 21, as shown in FIG. 2a.

The invention can also be implemented with seats installed in other means of transport, such as for example seats for buses, trains, or boats.

FIGS. 11 and 12 show a removable closure device 100 for a space inside an aircraft. The space to be closed may be a space separating two adjacent seats or a space separating a seat from an aisle.

The device 100 comprises a frame 101 comprising a first upright 102.1 and a second upright 102.2 connected to one another by a box 103. The uprights 102.1, 102.2 are oriented vertically, while the box 103 is arranged horizontally, so that the frame 101 generally has a U-shape.

The frame 101 comprises at least one fixation interface 105.1, 105.2 including a structural element, such as a seat shell or any other structural element inside an aircraft cabin. In this case, the first upright 102.1 comprises a fixation interface 105.1 to a shell of a first seat and the second upright 102.2 comprises a fixation interface 105.2 to a shell of a second seat.

A curtain assembly 106 comprises a flexible curtain 106.1 suitable for being rolled up on a drum 107. To this end, the drum 107 comprises an axis 107.1 rotatingly mounted relative to the frame 101. In addition, a rigid transversal bar 106.2 is attached to one end of the flexible curtain 106.1. Thus the curtain assembly 106 is formed by the curtain 106.1 as well as the transversal bar 106.2.

The flexible curtain 106.1 is preferably made out of a fabric. The curtain 106.1 could also be at least partially out of alcantara or leather to increase the perceived quality of the whole. The curtain 106.1 may be at least partially out of an acoustic absorption material.

The transversal bar 106.2 is preferably out of a metallic material, in particular aluminum. As a variant, the transversal bar 106.2 may be out of plastic or a composite material or any other possible rigid material.

The drum 107 is arranged at least partially inside the box 103. A cover (not shown) can be fixed to the box 103 in order to hide a part of the drum 107 protruding from the box 103.

As it can be seen in FIG. 12, at least one guiding device 109.1, 109.2 provides translational guidance of the curtain 106.1 relative to a corresponding upright 102.1, 102.2 between a stowed position and a deployed position. In this case, two guiding devices 109.1, 109.2 are provided, each arranged at least partially inside a housing 120.1, 120.2 delimited by a corresponding upright 102.1, 102.2. For this purpose, an upright 102.1, 102.2 may be formed by a metal sheet folded so as to form a corresponding housing 120.1, 120.2. As a variant, an upright 102.1, 102.2 may comprise several independent walls assembled together by screwing or mechanical welding.

Advantageously, a translational guiding device 109.1, 109.2 is a belt device. A belt device 109.1, 109.2 comprises a first pulley 121 rotatingly connected to the frame 101, in this case to an upper part of a corresponding upright 102.1, 102.2, a second pulley 122 rotatingly connected to the frame, in this case to a corresponding lateral portion of the box 103, and a belt 123 cooperating with the first pulley 121 and the second pulley 122. The belt 123 may be smooth or toothed or have the form of a chain. Preferably, a tension wheel 125, visible in FIG. 15, will tension the belt 123. As a variant, it will be possible to use more than two pulleys 121, 122 for each guiding device 109.1, 109.2.

As shown in FIG. 16, a connecting device 126 provides a connection between the belt 123 and the curtain assembly 106. For this purpose, the connecting device 126 is fixed to the curtain 106.1 or the transversal bar 106.2 and comprises a jaw mechanism clamping a portion of the belt 123. The curtain assembly 106 is thus integrally translatable with the belt 123.

During a phase of use, the passenger can grip the transversal bar 106.2 to manually move the curtain 106.1 in a direction of movement D parallel to a longitudinal direction of an upright 102.1, 102.2 between a stowed position, in which the flexible curtain 106.1 is mostly rolled up on the drum 107, so as to release the space, as shown in FIG. 13a, and an deployed position, in which the flexible curtain 106.1 is mostly unrolled from the drum 107, so as to close the space, as shown in FIG. 13c. The curtain 106.1 can also take intermediate positions, as shown in FIG. 13b.

One end of the transversal bar 106.2 is able to slide inside a groove 128.1, 128.2 made in a corresponding upright 102.1, 102.2, when moving the curtain 106.1 from one position to another.

Advantageously, as can be seen in FIG. 14, a return spring 130 of the curtain 106.1 is configured to tension the curtain 106.1, when the latter is in the deployed position. This return spring 130 may be a torsion spring mounted on an axis of the drum 107. The return spring 130 comprises one end fixed to the drum 107 and one end fixed to the frame 101.

A spring for assisting the deployment 131 of the curtain 106.1 makes it possible to facilitate the deployment of the curtain 106.1, when the passenger pulls it from the stowed position to the deployed position, as shown in FIG. 15. The spring 131 for assisting the deployment is advantageously a torsion spring comprising one end fixed to the frame 101 and one end fixed to at least one pulley 122. The spring 131 for assisting deployment is arranged on an axis 132 parallel to the axis of the drum 107. The pulleys 122 are preferably mounted on the axle 132.

As it can be seen in FIG. 16, a rotating roller 133 connected to the curtain assembly 106 is able to roll along a wall of an upright 102.1, 102.2, when the curtain 106.1 is moved from one position to another. In order to control the movement of the curtain 106.1, the rotating roller 133 bears against a stop 134, when the curtain 106.1 is in the deployed position.

It will be possible to use one roller 133 per upright 102.1, 102.2, that is to say two rollers 133 for the removable closure device 100, or a single roller 133 for a single upright between the two uprights 102.1 or 102.2. As a variant, it would also be possible to use more than one guiding roller 133 per upright 102.1, 102.2.

FIGS. 17a and 17b show a removable closure device 100 integrated into an assembly 135 of aircraft seats comprising two front seats 136 each associated with a front shell 136.1 and two rear seats 137 each associated with a rear shell 137.1.

A removable closure device 100 is arranged between a front seat 136 and a rear seat 137. To this end, the first upright 102.1 is attached to the front shell 136.1 of a front seat 136 via its fixation interface 105.1, while the second upright 102.2 is fixed to the rear shell 137.1 of a rear seat 137 via its fixation interface 105.2. To this end, a fixation interface for an upright 102.1, 102.2 comprises holes for the passage of fixation members, such as screws, rivets, or studs, or other members adapted to the application, also passing through holes in the corresponding shell 136.1, 137.1.

During an assembly phase, one begins by fixing an upright of the closure device 100 to one of the shells, for example the rear shell 137.1, then the other shell, for example the front hull 136.1, is attached to the other upright of the closure device 100.

The invention thus makes it possible, thanks to the integration of the closure device 100, to easily isolate the two rear seats 137, arranged side by side, or on the contrary to allow communication between the two rear seats 137.

The invention also has the advantage of being easily integrated into the aircraft cabin and of being easily released from the passage in the event of an accident due to the flexible nature of the curtain.

In the embodiment in FIG. 18, the flexible curtain 106.1 is fully translatable along the direction of movement D, such that the flexible curtain 106.1 extends in a plane in the stowed position and deployed position. In other words, the flexible curtain 106.1 is simply translated without being rolled up or folded when it passes from the deployed position to the stowed position.

In the embodiment in FIG. 19, the flexible curtain 106.1 can be moved in the direction of movement D between a stowed position, in which the flexible curtain 106.1 is folded, in particular as an accordion, and an deployed position, in which the flexible curtain 106.1 extends in a plane. In this case, the folds of the accordion overlap vertically on each other, when the flexible curtain 106.1 is in the stowed position.

Obviously, the invention is not limited to the above-described embodiments provided solely by way of example. It encompasses various modifications, alternative forms and other variants which a person skilled in the art may envisage in the context of the present invention and in particular any combination of the various above-described operating modes, which may be taken separately or in combination.

The invention claimed is:

1. A removable closure device for a space inside an aircraft, comprising:
a frame comprising a first upright and a second upright, said frame comprising at least one fixation interface including a structural element,
a curtain assembly comprising a flexible curtain, and
at least one guiding device for ensuring a translational guiding of the flexible curtain with respect to the upright, so that the flexible curtain is able to be moved in a direction of movement parallel to a longitudinal direction of the uprights between a stowed position, in which the flexible curtain is released from the space, and a deployed position, in which the flexible curtain closes the space,
wherein the upright defines a housing, in which the guiding device is at least partially arranged,
wherein the removable closure device comprises a drum having an axis, on which the flexible curtain can be rolled up, so that the flexible curtain is able to be moved in the direction of movement between the stowed position, in which the flexible curtain is mostly rolled up on the drum, and the deployed position, in which the flexible curtain is mostly unrolled from the drum,
wherein the first upright and the second upright are connected to one another by a box, in which the drum is at least partially arranged, and
wherein said removable closure device further comprises at least one rotating roller capable of rolling along a wall of the first upright or the second upright when the curtain is moved from one position to another, said rotating roller having an axis perpendicular to the axis of the drum.

2. The removable closure device according to claim 1, wherein the guiding device is a belt device.

3. The removable closure device according to claim 2, wherein said belt device comprises a first pulley rotatingly connected to the frame, a second pulley rotatingly connected to the frame, and a belt cooperating with the first pulley and the second pulley.

4. The removable closure device according to claim 2, wherein a connecting device provides a connection between the belt and the curtain assembly.

5. The removable closure device according to claim 1, further comprising a deployment assistance spring for the flexible curtain.

6. The removable closure device according to the claim 5, wherein the deployment assistance spring for the curtain comprises a torsion spring having one end fixed to the frame and one end fixed to a pulley.

7. The removable closure device according to claim 1, further comprising a return spring for the curtain configured to tension the curtain when the curtain is in the deployed position.

8. The removable closure device according to claim 1, further comprising a stop, with which the rotating roller comes into contact when the curtain is in the deployed position.

9. The removable closure device according to claim 1, wherein the curtain assembly comprises a rigid transversal bar fixed to one end of the flexible curtain.

10. The removable closure device according to claim 9, wherein one end of the transversal bar is able to slide inside a groove made in the upright.

11. An assembly of airplane seats comprising:
a front seat associated with a front shell and a rear seat associated with a rear shell, and
a removable closure device, according to claim 1, arranged between the front seat and the rear seat.

12. The assembly of seats according to claim 11, wherein the removable closure device comprises a frame having a first upright provided with a fixation interface to ensure a fixation between the first upright and the front shell of the front seat and a second upright provided with a fixation interface to ensure a fixation between the second upright and the rear shell of the rear seat.

13. An airplane comprising an assembly of airplane seats as defined in claim 11.

* * * * *